(12) United States Patent
Burgess et al.

(10) Patent No.: US 7,653,774 B2
(45) Date of Patent: Jan. 26, 2010

(54) BRIDGE WITH SEQUENTIAL SOFTWARE MODULES

(75) Inventors: Paul Burgess, Totten (GB); Steven Hayter, Christchurch (GB); Darren Hayward, Southampton (GB); David Trossell, Everton Lymington (GB)

(73) Assignee: Bridgeworks Limited, Christchurch, Dorset (GB)

( * ) Notice: Subject to any disclaimer, the term of this patent is extended or adjusted under 35 U.S.C. 154(b) by 141 days.

(21) Appl. No.: 11/637,190

(22) Filed: Dec. 12, 2006

(65) Prior Publication Data

US 2007/0156926 A1 Jul. 5, 2007

(30) Foreign Application Priority Data

Dec. 15, 2005 (GB) ................................. 0525556.7

(51) Int. Cl.
*G06F 13/36* (2006.01)
*G06F 9/46* (2006.01)
*G06F 9/00* (2006.01)

(52) U.S. Cl. ...................... 710/315; 710/306; 710/310; 718/102; 718/103; 726/13; 707/8

(58) Field of Classification Search ................. 710/310; 718/103; 707/8
See application file for complete search history.

(56) References Cited

U.S. PATENT DOCUMENTS

| | | | | |
|---|---|---|---|---|
| 5,625,832 A | * | 4/1997 | Ohsawa et al. | ................. 712/28 |
| 6,065,088 A | | 5/2000 | Bronson et al. | |
| 6,209,023 B1 | * | 3/2001 | Dimitroff et al. | ............ 709/211 |
| 6,442,749 B1 | * | 8/2002 | Hirao et al. | ................. 717/170 |
| 6,606,710 B2 | * | 8/2003 | Krishnan et al. | ............... 726/13 |
| 6,782,531 B2 | * | 8/2004 | Young | ........................ 717/130 |
| 6,853,960 B2 | * | 2/2005 | Yamanaka et al. | .......... 702/188 |
| 7,150,018 B2 | * | 12/2006 | Golds et al. | ................. 718/102 |

(Continued)

FOREIGN PATENT DOCUMENTS

EP 1406415 A2 4/2004

(Continued)

OTHER PUBLICATIONS

Avax International, "Potomac iSCSI-SCSI Bridge"—Retrieved Sep. 30, 2008, 2 pages.*

(Continued)

*Primary Examiner*—Mark Rinehart
*Assistant Examiner*—Brian T Misiura
(74) *Attorney, Agent, or Firm*—Banner & Witcoff, Ltd.

(57) ABSTRACT

A bridge includes first and second network connections, and processor means and memory together operating to implement plural software modules. These allow data to be passed between the network connections and allow the data to be handled as it passes. Each software modules has a priority, either pre-set in software or settable by the bridge in response to receiving a command from a device connected to the bridge. The bridge is operable to arrange the software modules sequentially between the network connections, such that data provided by a software module is received at the next software module in the sequence, according to their priorities. Software modules can be added to or removed from the sequence. This can be carried out dynamically, for instance by the bridge following a determination from monitoring of data flow that such would improve performance.

25 Claims, 3 Drawing Sheets

U.S. PATENT DOCUMENTS

| | | | |
|---|---|---|---|
| 7,353,260 B1 * | 4/2008 | Senum | 709/217 |
| 7,441,020 B2 * | 10/2008 | Dideriksen et al. | 709/221 |
| 7,447,875 B1 * | 11/2008 | Henriksen | 712/202 |
| 7,512,071 B2 * | 3/2009 | Goldschmidt et al. | 370/235 |
| 7,586,942 B2 * | 9/2009 | Golasky et al. | 370/466 |
| 2003/0198241 A1 | 10/2003 | Putcha et al. | |
| 2004/0064814 A1 * | 4/2004 | Bowers et al. | 718/100 |
| 2007/0088795 A1 * | 4/2007 | Dunbar | 709/217 |
| 2007/0174470 A1 * | 7/2007 | Burgess et al. | 709/227 |
| 2007/0288568 A1 * | 12/2007 | Hayter | 709/204 |

FOREIGN PATENT DOCUMENTS

| | | |
|---|---|---|
| GB | 2096369 A | 3/1981 |

OTHER PUBLICATIONS

Cisco Systems, "iSCSI Protocol Concepts and Implementation"—Retrieved Sep. 30, 2008, 12 pages.*

European Search Report dated Apr. 6, 2006 for Application No. GB0525556.7.

* cited by examiner

BRIDGE WITH SEQUENTIAL SOFTWARE MODULES

FIELD OF THE INVENTION

This invention relates to a bridge.

BACKGROUND OF THE INVENTION

It is known to connect two networks together with a bridge. The networks may be of the same type, or they may be of different types. Example network types are SCSI (Small Computer Serial Interface), Fibre Channel, ISCSI (Internet SCSI), ATA (Advanced Technology Attachment), Serial ATA, Infiniband and Serial Attached SCSI, although there are many others. Bridges often connect a network to which a number of host stations are connected to a SAN (storage area network), although they can also be put to other uses. As well as performing any necessary communication protocol conversion, bridges can provide some additional functionality. Examples of bridges are the Potomac and Tamar bridge products vended by Bridgeworks Limited of 135 Somerford Road, Christchurch, Dorset, United Kingdom.

The invention is concerned with improving the performance, configurability and reliability of a bridge.

SUMMARY OF THE INVENTION

The invention provides a bridge comprising:
first and second network connections,
processor means, and
memory, the processor means and the memory together operating to implement plural software modules, the software modules being for allowing data to be passed between the first and second network connections and for handling the data as it passes between the first and second network connections, wherein each of the software modules has associated therewith a respective priority, and wherein the bridge is operable to arrange the software modules sequentially between the first and second network connections, such that data provided by a software module is received at the next software module in the sequence, according to their allocated priorities.

Embodiments of the invention will now be described by way of example only with reference to the accompanying drawings.

DETAILED DESCRIPTION OF THE PREFERRED EMBODIMENTS

Figure 1:
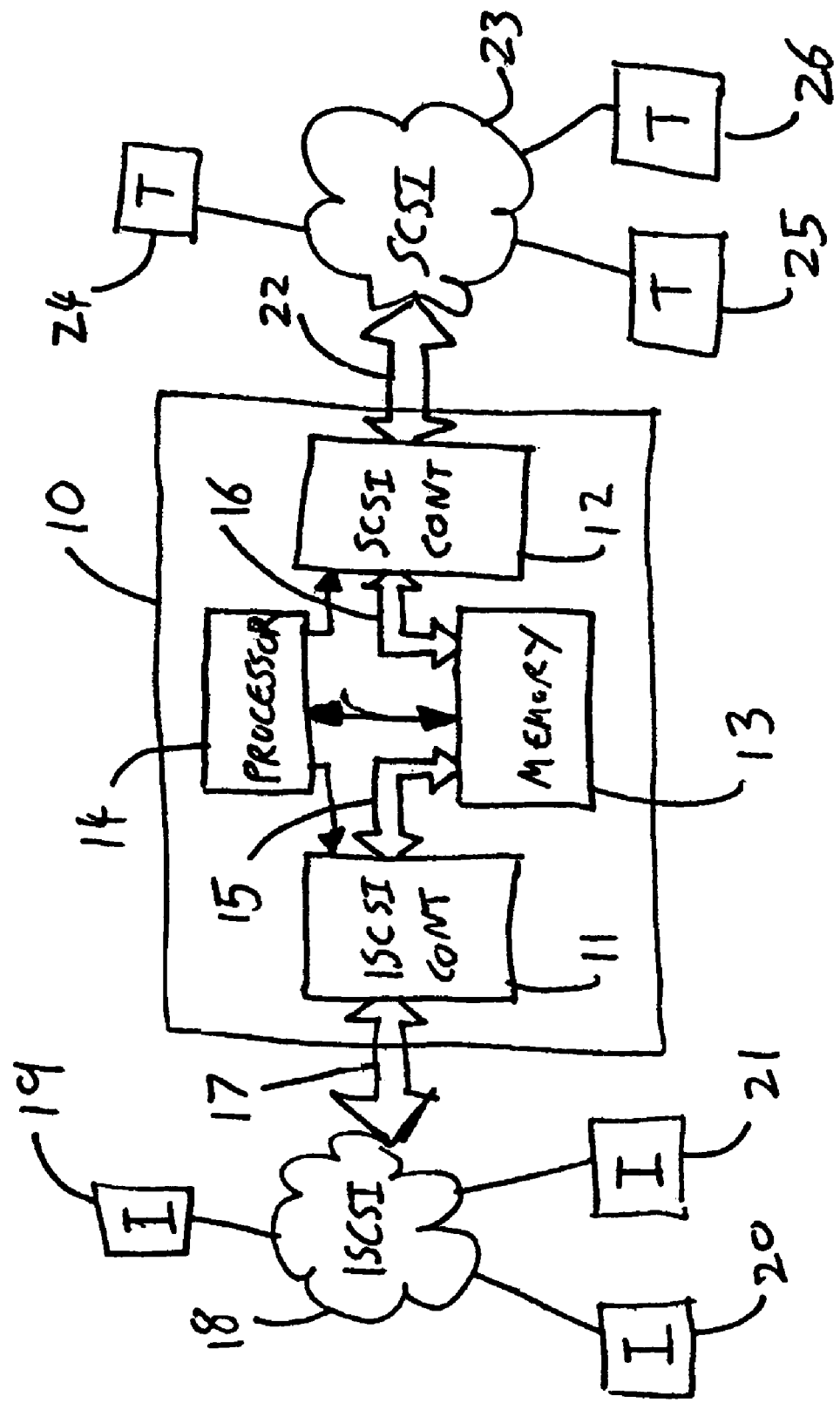
FIG. 1 is a schematic drawing illustrating certain a bridge according to the invention connected between two networks.

In the Figures, the same reference numerals are used for like elements throughout.

Referring to FIG. 1, a bridge 10 includes an iSCSI controller 11, which here includes an associated IP (Internet Protocol) controller, a SCSI controller 12, a memory 13 and a processor 14. The processor effects control over the iSCSI and SCSI controllers 11, 12, and is operable with the memory 13 to execute software so as to perform its functions. Software is permanently stored in non-volatile memory (not shown). This software includes an operating system, upon which the bridge runs application software. The iSCSI and SCSI controllers 11, 12 are connected by respective internal buses 15, 16 to the memory 13. Clearly this Figure is merely schematic; the bridge also includes a power supply along with various other components not relevant to this explanation.

The iSCSI controller 11 is connected via an iSCSI connector 17 to a first network, here an IP network 18. In practise, the IP network 18 is able to carry IP (Internet Protocol) packets. iSCSI is a standard developed to allow SCSI packets to be carried within IP packets. An iSCSI packet basically comprises a SCSI packet as the payload of an IP packet including an IP header. Thus, the IP network 18 can also be termed an iSCSI SAN network. Connected to the iSCSI network 18 are a number of workstations, illustrated in the Figure as first, second and third Initiators 19, 20, 21.

The SCSI controller 12 is connected via an SCSI connector 22 to a second network, here in the form of an SCSI bus 23. Connected to the SCSI bus 23 are a number of storage devices, illustrated in the Figure as first, second and third Targets 24, 25 and 26.

The bridge 10 serves to connect devices on the first network 18 with devices on the second network 23. In this example, the bridge allows iSCSI devices in the form of the first, second and third Initiators 19, 20, 21 to utilise SCSI storage devices, such as hard disk or tape devices, in the form of the first, second and third Targets 24, 25 and 26 together comprising a SAN for storage of data and for the retrieval of data therefrom. As is described below, the bridge handles data in SCSI format. However, it will be understood that the invention is not limited to these network types, nor is it limited to the provision of access to a SAN nor to the handling of SCSI data.

Figure 2:
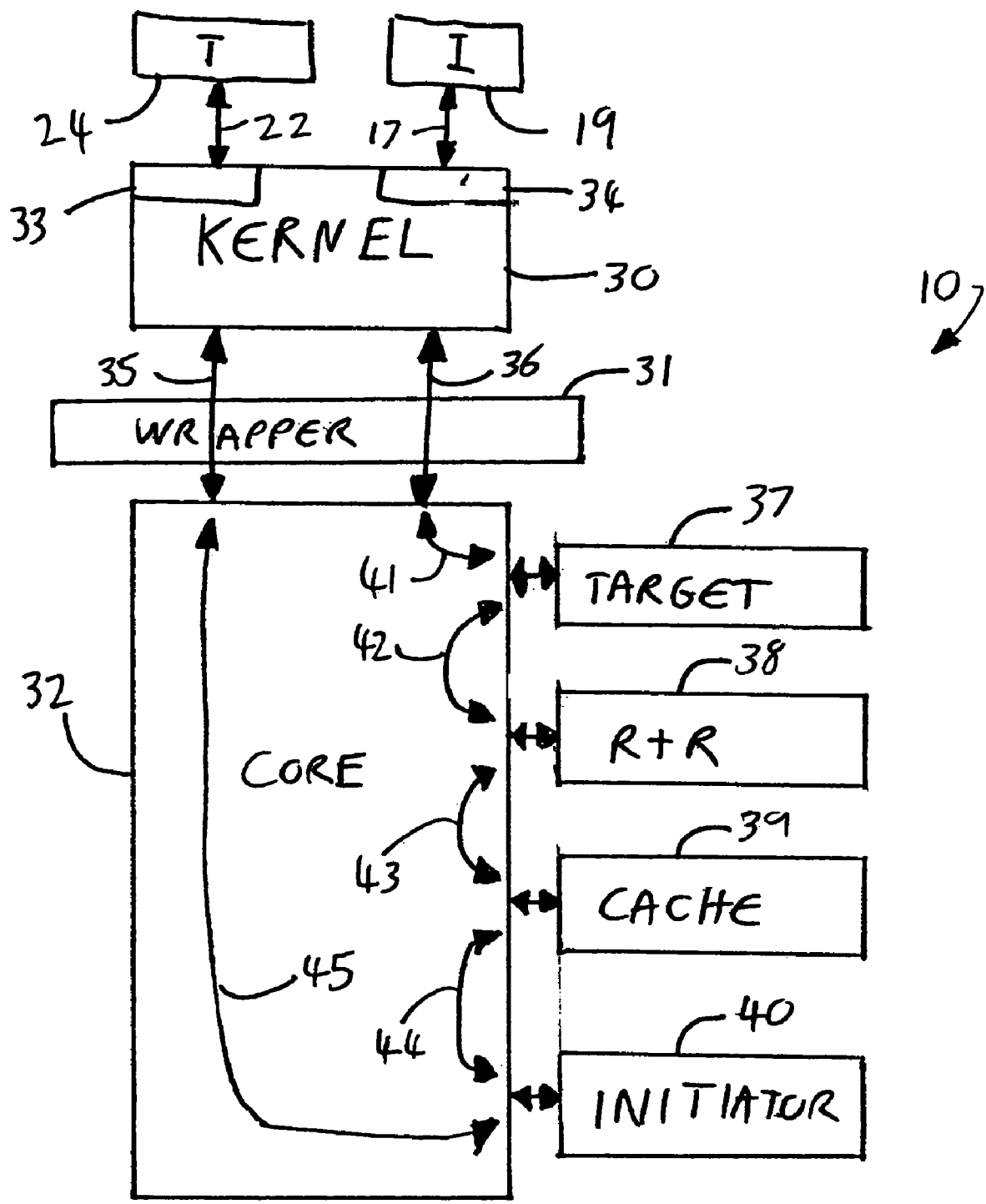
FIG. 2 is a schematic drawing illustrating in more detail some of the components of the FIG. 1 bridge and its operation.

Referring now to FIG. 2, the bridge is shown in more detail. The bridge 10 is divided into functional blocks. In particular, the bridge comprises a kernel 30, a wrapper 31 and a core 32. The kernel 30 includes a SCSI interface portion 33, which is connected bidirectionally via the SCSI connector 22 to a Target 24. The kernel also includes an IP interface portion 34, which is connected bidirectionally via the iSCSI connector 17 to an Initiator 19. The SCSI interface portion 33 includes the IP controller 12 and some associated software. The IP interface portion 34 includes the IP controller 11, an Ethernet driver and some TCP/IP software. First and second bidirectional wrapper paths 35, 36 are made from the kernel through the wrapper 31 to the core 32.

The module core 32 includes an iSCSI target module 37, a reserve and release module 38, a cache module 39 and an SCSI initiator module 40 connected in series between the second bidirectional wrapper path 36 and the first bidirectional wrapper path 35. In particular, a first core path 41 connects the second bidirectional path 36 to the iSCSI target module 37, a second core path 42 connects the iSCSI target module 37 to the reserve and release module 38, a third core path 43 connects the reserve and release module 38 to the cache module 39, a fourth core path 44 connects the cache module 39 to the SCSI initiator module 40, and a fifth core path 45 connects the SCSI initiator module 40 to the first bidirectional path 35.

Each module, namely the iSCSI target module 37, the reserve and release module 38, the cache module 39 and the SCSI initiator module 40, is a software module. Each module.37, 38, 39 and 40 operates on a respective thread of the operating system. Thus, the modules 37, 38, 39 and 40 operate in parallel to one another.

On power-up of the bridge 10, the bridge is initialised. This is a four stage process. Firstly the memory 13 is preset. This sets up the memory in advance of operation of the bridge 10, and avoids the need to allocate memory on-the-fly. In this connection, the memory is preset to store information about modules, flags, pointers to queues, pointers to names, unique module identifiers and priorities for modules etc. The significance of the setting of priorities for modules is explained below. The second stage comprises resource allocation. In this stage, allocation is made for resources needed for the paths (for data and other communications) between modules 37, 38, 39 and 40, e.g. queues, semaphores and mutexes. These resources are allocated specifically for the modules 37, 38, 39 and 40. In the third stage, the modules 37, 38, 39 and 40 are initiated. Each module has its own initiation function, e.g. concerning the caches needed for each target and initiator device. The fourth step is to order the modules according to their priorities set in the second stage. Before explaining how modules are prioritised, for which see below, the operation of the modules in processing messages and data is described.

Briefly, when a message, such as a command, is received from the initiator 19 at the IP interface portion 34, limited processing of it is performed by the kernel 30. After this limited processing, the kernel 30 stores information relating to the message, the raw data associated with the message, pointers to the raw data, and one or more IP addresses in the memory 13. The kernel 30 then produces one or more pointers to the message. The one or more pointers to the message then are passed to the wrapper 31, which uses the pointer(s) to obtain the message from the memory 13, and performs some modification of certain components of the message. The modified message then is passed via the first path 41 to the iSCSI target module 37. The iSCSI target module 37 extracts various items of information from the received modified message. The information that the iSCSI target module 37 extracts from the modified message includes: a pointers to a command description block (CDB), one or more pointers to the raw data, information identifying the number of pointers to raw data, a pointer to the target device that the message relates to, for instance a pointer to the target 24, a pointer to the initiator device 19, a pointer to the next data, an identifier which is unique to the SCSI data packet, a number of SCSI data flags (identified below), a reference count, information identifying the expected length of the data, information identifying the actual length of the data, a hash of the unique identifier of the initiator device, and a generic reason code.

The blocks of raw data for a message normally are stored sequentially in the memory 13. The pointer to the next data might be a pointer to data associated with a different message, and may be concerned with a different target device and/or a different initiator device. The hash of the unique identifier of the initiator device is used in place of the unique identifier itself since it has been found just as effective yet utilises a significantly reduced data overhead. The generic reason code can be used to reset modules, amongst other things.

The SCSI data flags indicate whether SCSI is cacheable, whether a SCSI CDB is sent, whether SCSI data is awaited, whether a SCSI reply is sent, whether the SCSI command has been sent to the SCSI controller 33, whether a SCSI device is awaiting release and whether a SCSI device is awaiting reserve.

The generic reason code is either a general reason, a task management request reason or a response reason. The available general reasons are: fatal error, not supported, system shutdown and module shutdown. Typical iSCSI task management request reasons are: abort task, abort task set, clear ACA, clear task set, logical unit reset, target warm reset, target cold reset and task reassign. The available response reasons are: good, rejected, task non-existent, LUN (logical unit number) non-existent, task allegiant and authorisation failure.

The SCSI data message is processed by the iSCSI target module 37 according to the function provided by the software comprising the target module. The iSCSI target module 37 is the module that communicates most directly with the initiator 19. The SCSI Initiator module 40 serves as an interface to the protocol that the target 24 uses. When the iSCSI target module 37 has finished processing the iSCSI data message, the result is forwarded to the reserve and release module 38 via the second path 42. The SCSI data message passed to the reserve and release module 38 may have been modified by the iSCSI target module 37. Alternatively or additionally, the raw data pointed at by the pointers forming part of the SCSI data message may have been modified by the target module. The particular modification effected by the iSCSI target module 37 is not important to this explanation so is not described in detail here.

The SCSI data message received from the iSCSI target module 37 is processed by the reserve and release module 38 according to the function provided by the software comprising that module. In some cases, the reserve and release module 38 will return the SCSI data packet to the iSCSI target module 37 with a modified generic reason code. Normally, though, the reserve and release module 38 merely passes the SCSI data message via the third path 43 to the cache module.

The SCSI data message received from the reserve and release module 38 is processed by the cache module 39 according to the function provided by the software comprising the cache module. If the originating message is a data write command, the processing effected by the cache module 39 processes the SCSI data message to modify it in such a way as to cause later the target device 24 to perform the required action. When the cache module 39 has finished processing the SCSI data message, the resulting SCSI data message is forwarded to the SCSI initiator module 40 via the fourth path 44. Depending on the contents of the SCSI data message and the programmed function of the cache module 39, the cache module may also send a SCSI data message back to the reserve and release module 38 for passing onwards to the initiator 19.

The SCSI data message received from the cache module 39 is processed by the SCSI initiator module 40 according to the function provided by the software comprising the initiator module. The SCSI initiator module 40 is the module that communicates most directly with the target 24. The SCSI initiator module 40 serves as an interface to the protocol that the initiator 19 uses.

When the SCSI initiator module 40 has finished processing the SCSI data message passed to it by the cache module 39, the resulting SCSI data message is forwarded to the wrapper 31 via the fifth path 45. The SCSI data message passed to the wrapper 31 may have been modified by the SCSI initiator module 40. Alternatively or additionally, the raw data pointed at by the pointers forming part of the SCSI data message may have been modified by the SCSI initiator module 40. The particular modification effected by the SCSI initiator module 40 is not important to this explanation so is not described in detail here.

The wrapper 31 performs some modification of certain components of the SCSI data message and passes the result to the kernel 30. The kernel 30 uses pointers and other information provided by the wrapper 31 to retrieve the information relating to the message, the raw data associated with the message, the pointers to the raw data, etc., and performs additional processing. The kernel then uses the SCSI interface portion 33 to send a suitable SCSI message to the target 24.

The bridge 10 functions similarly in the opposite direction. In particular, when a message, for instance a SCSI response (generated in response to a received command), is received from a target device, such as the target 24, limited processing of it is performed by the kernel 30. The kernel 30 stores information relating to the message, the raw data associated with the message, pointers to the raw data, one or more IP addresses, etc. The message then is passed to the wrapper 31, which performs some modification of certain components of the message, as is described in more detail below. The modified message then is passed via the fifth core path 45 to the SCSI initiator module 40 as a SCSI data message including various items of information. The information that the SCSI data message includes is the same as that described above.

The SCSI data message is processed by the SCSI initiator module 40 according to the function provided by the software comprising the initiator module. The processing of the SCSI initiator module 40 when operating on SCSI data messages passing in this direction is likely to be quite different to the processing performed on SCSI data messages passing in the opposite direction. This difference arises from differences in the contents of the SCSI data packets, and not from the initiator module responding differently depending on the direction in which the SCSI data packet is being sent. The resulting SCSI data packet is passed via the fourth core path 44 to the cache module 39.

The SCSI data message received from the SCSI initiator module 40 is processed by the cache module 39 according to the function provided by the software comprising the cache module. When the cache module 39 has finished processing the SCSI data message, the result may be forwarded to the reserve and release module 38 via the third path 43. Alternatively, a SCSI data message may be returned to the SCST initiator module 40. Depending on the contents of the SCSI data message received at the cache module 38 over the third path 43 and the programmed function of the cache module 39, the cache module may also send a SCSI data message back to the SCSI initiator module 40.

The SCSI data message received from the cache module 39 is processed by the reserve and release module 38 according to the function provided by the software comprising that module. In some cases, the reserve and release module 38 will return the SCSI data packet to the cache module 39 with a generic modified reason code. Normally, though, the reserve and release module 38 merely passes the SCSI data message via the second path 42 to the iSCSI target module 37.

The SCSI data message received from the reserve and release module 38 is processed by the iSCSI target module 37 according to the function provided by the software comprising the target module. The target module 40 serves as an interface to the protocol that the target 24 uses. When the iSCSI target module 37 has finished processing the SCSI data message, the resulting iSCSI data message is forwarded to the wrapper 31 via the second path 42. The SCSI data message passed to the wrapper 31 may have been modified by the iSCSI target module 37. Alternatively or additionally, the raw data pointed at by the pointers forming part of the iSCSI data message may have been modified by the target module.

The wrapper 31 performs some translation of certain components of the iSCSI data message and passes the result to the kernel 30. The kernel 30 uses pointers and other information provided by the wrapper to retrieve the information relating to the message, the raw data associated with the message, the pointers to the raw data, the one or more IP addresses, and the iSCSI message formatted descriptor block stored in the memory 13 by the kernel previously, and performs additional processing. The kernel then uses the IP interface portion 34 to send a suitable iSCSI message to the initiator 19.

Figure 3:
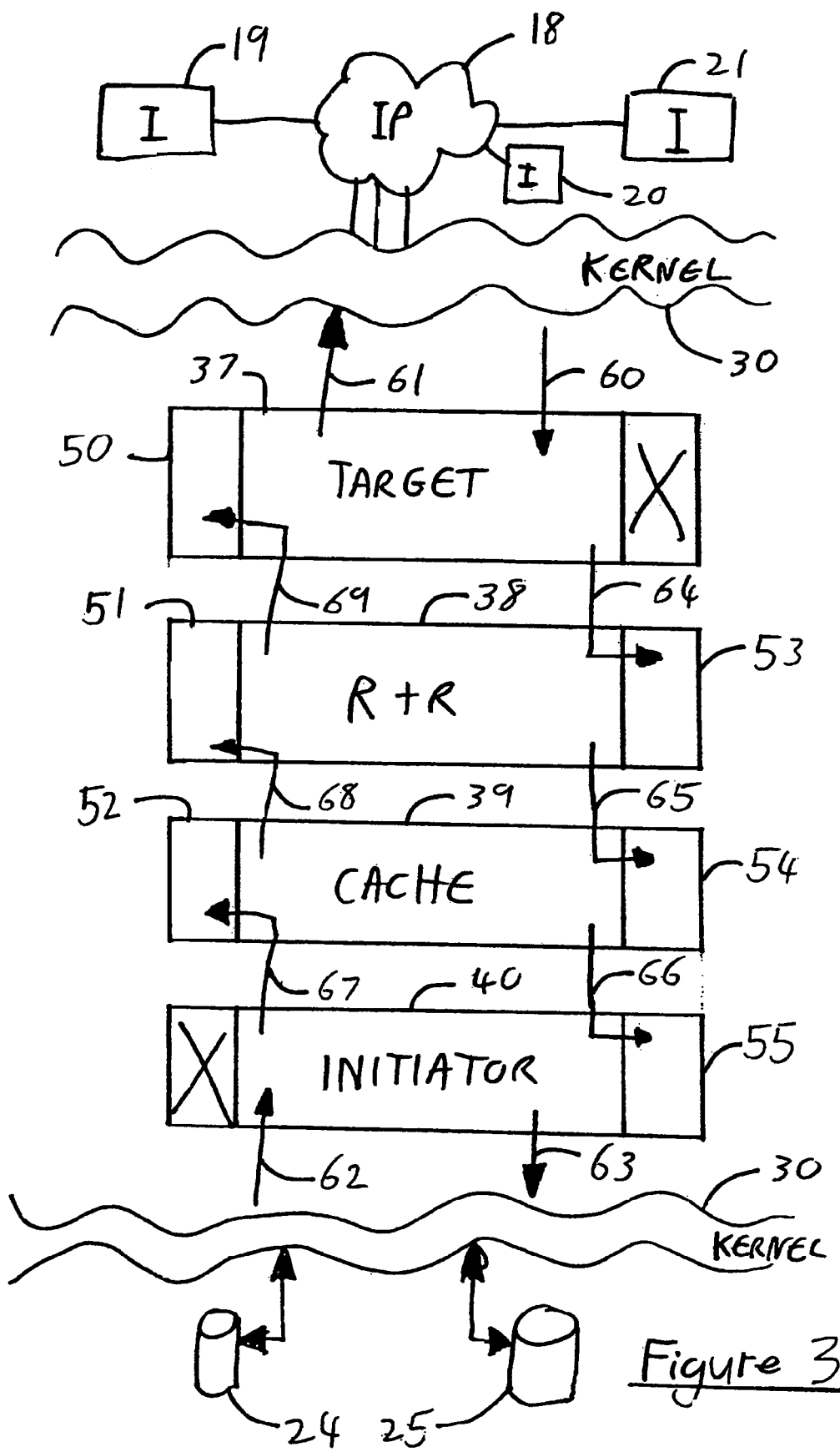
FIG. 3 is a schematic drawing illustrating in more detail some other of the components of the FIG. 1 bridge and its operation.

The bridge 10 includes queues for SCSI data messages being passed between modules, as will now be described with reference to FIG. 3. The bridge 10 shown in FIG. 3 is the same as the bridge of FIGS. 1 and 2, although more detail of the modules is shown and some components not relevant to this explanation are omitted. As shown in the Figure, the target module 37 includes a target from down queue 50, the reserve and release module 38 includes a reserve and release from down queue 51, and the cache module 39 includes a cache from down queue 52. The initiator module 40 does not include a from down queue. The term 'from down' is used because the queues 50, 51 and 52 are operable to receive messages from down the stack as show in the Figure, i.e. the queues are operable to receive messages from the module which is adjacent to and which has a higher priority than the module that includes it.

Similarly, the reserve and release module 38 includes a reserve and release from up queue 53, the cache module includes a cache from up queue 54 and the initiator module includes an initiator from up queue 55. The target module 37 does not include a from up queue.

A part of the memory 13 is allocated for each of the queues 50-55 as part of the second stage of the process performed on power-up, as described above. The amount of the memory 13 that is allocated for each of the queues 50-55 might be configurable or it might be fixed. In this example, the amount of memory allocated to each queue 50-55 is sufficient to store up to four SCSI data messages, although longer or shorter queues may be more suitable in some implementations.

Some messages are handled by one of the modules 50-55 without being queued. In particular, SCSI data messages received at the target module 37 from the kernel 30 over a first path 60 are passed directly into that module. SCSI data messages leaving the target module 37 for the kernel 30 follow a second path 61 without being queued. SCSI data messages received at the initiator module 40 from the kernel 30 follow a third path 62 directly into that module. SCSI data messages leaving the initiator module 40 for the kernel 30 follow a fourth path 63 without being queued.

However, SCSI data messages sent from a module towards an adjacent module are first placed in a queue of the destination module. Which of the queues of that module (if it has more than one queue) depends on whether the SCSI data message is being passed up or down the stack of modules. In particular, a SCSI data message passed from the target module 37 to the reserve and release module 38 is passed over a fifth path 64 into the reserve and release from up queue 53. A SCSI data message passed from the reserve and release module 38 to the cache module 39 is passed over a sixth path 65 into the cache from up queue 54. A SCSI data message passed from the cache module 39 to the initiator module 40 is passed over a seventh path 66 into the initiator from up queue 55. In the other direction, A SCSI data message passed from the initiator module 40 to the cache module 39 is passed over an eighth path 67 into the cache from down queue 52. A SCSI data message passed from the cache module 39 to the reserve and release module 38 is passed over a ninth path 68 into the reserve and release from down queue 51. A SCSI data message passed from the reserve and release module 38 to the target module 37 is passed over a tenth path 69 into the target from down queue 50.

For the period of time that it takes a module to write a SCSI data command to a queue 50-55 of an adjacent module 38-40, the queues for the module that the SCSI data message is being written to are locked. For instance, when the reserve and release module 38 is ready to pass a SCSI data message to the cache module 39, the reserve and release module 38 locks the cache from down queue 52 and the cache from up queue 54, then begins to write the SCSI data message to the cache from up queue 54. The locking of the cache from down queue 52 and the cache from up queue 54 also prevents the cache module 39 reading from either of its queues. Alternatively, it is only the queue that a SCSI data message is being written to that is locked, and the module including that queue is able to read a SCSI data message from its other queue whilst message writing is occurring. For instance, when the reserve and release module 38 is ready to pass a SCSI data message to the cache module 39, the reserve and release module 38 locks the cache from up queue 54 from being accessed by the cache module 39. However, this does not lock the cache from down queue 52, which thus is able to be written to by the initiator module 40 and is able to be read from by the cache module 39, although these two actions cannot be carried out at the same time.

When a module has finished writing a message to a queue 50-55, it releases the lock of that queue 50-55 (or both queues of that module, as the case may be) and semaphores to the module 37-40 associated with the queue 50-55 that has been written to that the lock is released. The locking feature described above prevents a module being able to read a message from one of its queues whilst that or another message is being written to that queue.

The queues 50-55 are first-in, first-out (FIFO) queues. In this way, SCSI data messages are handled by a module in the order in which they were received at the module.

Each of the queues 50-55 is arranged so that only the appropriate module 37-40 can write SCSI data messages to it and so that only the appropriate module 37-40 can read SCSI data messages from it. There is only one module 37-40 that can write to a given queue 50-55, and only one module 37-40 that can read from that queue. For instance, in the case of the reserve and release from down queue 51, only the cache module 39 is able to write SCSI data messages to it and only the reserve and release module 38 is able to read SCSI data messages from it.

When the cache module 39 or the reserve and release module 38 finishes processing a SCSI data message, it passes the result into the appropriate queue 50, 51, 54, 55 of the appropriate adjacent module 37-40. At this point, the module 38, 39 examines all of its queues 51-54 and determines the lengths of those queues. The module 38, 39 also examines the length of the from down queue 50, 52 in the module 37, 38 above it in the stack and the length of the from up queue 54, 55 in the module 39, 40 below it in the stack. The module 38, 39 then uses this information to decide what SCSI data command to process next.

If there are no SCSI data commands in its queues 51-54, then the module 38, 39 merely waits until there is at least one SCSI data command in its queues 51-54. If the module 38, 39 determines that the from down queue 50, 51 in the module 37, 38 immediately above it is full, and thus cannot receive any further SCSI data commands for the time being, the module gives precedence to SCSI data commands in its from up queue 53 or 54. Similarly, if the module 38, 39 determines that the from up queue 54, 55 in the module 39, 40 immediately below it is full, and thus cannot receive any further SCSI data commands for the time being, the module gives precedence to SCSI data commands in its from down queue 51 or 52. If the module 38, 39 determines that the from down queue 50, 51 in the module 37, 38 immediately above it is full and that the from up queue 54, 55 in the module 39, 40 immediately below it is full, the module waits before handling any SCSI data messages present in its queues. If the relevant queues in the modules 37-40 above and below the module 38, 39 are not full, the module 38, 39 processes a SCSI data message from the front of the one of its queues 51-54 which is the longest.

Since the target and initiator modules 37, 40 have only a single queue and an input path from the kernel, these modules 37, 40 are arranged slightly differently. In particular, these modules 37, 40 determine whether a SCSI data message is expected to be received from the kernel 30, and treat that message as though it was a queued message. In this way, a SCSI data message will not be received from the kernel 30 if the target or initiator module 37, 40 determines that the queue in the adjacent module is unable to accept the SCSI data message after handling by that module. Instead, the module 37, 40 handles the message, if there is one, at the front of its sole queue.

The prioritisation and ordering of the modules 37, 38, 39 and 40 will now be described.

As mentioned above, each of the modules is assigned a priority at start-up. The priority of the modules determines their positions within the module core 32, and thus the order of the processing of SCSI data messages by the modules. In an example embodiment, the iSCSI target module 37 is allocated a priority of 0000 and the SCSI initiator module 40 is allocated a priority of FFFF. These priorities are four character hexadecimal figures, although any other suitable priority scheme may be used. The priorities allocated to the iSCSI target module 37 and the SCSI initiator module 40 place them first and last respectively in the stack in the module core 32. In this embodiment, the reserve and release module 38 is allocated a priority of 4444, and the cache module 39 is allocated a priority of 8888. The priority is allocated to each module in the second stage of the start-up process, as described above. The priority of each of the modules 37, 38, 39 and 40 in this embodiment is pre-set in the software that implements the module core 32.

The fourth stage of the start-up process orders the modules 37, 38, 39 and 40 according to their priorities. This process begins by inserting the modules 37, 38, 39 and 40 in the core in any order. The process then examines the priorities of the first two modules in the core, and determines whether they are in the correct order. The modules are in the correct order if value of the priority the first module is a lower number than the value of the priority of the second module. If they are not in the correct order, then the process reverses their positions in the stack in the module core 32. Following this position reversal or if the modules were in the correct order, the process proceeds to examine the second and third modules. The process applies the same test, and reverses or does not reverse the positions according to the result. This continues with the third and fourth modules until the process reaches the end of the stack of modules. In this example there are only four modules 37, 38, 39 and 40, but the process is applicable to bridges including any number of modules. After reaching the end, the process begins again by testing the priorities of the first and second modules and reversing their positions as necessary, then the second and third modules etc. This continues until the process determines that a full sweep of the stack of modules 37, 38, 39 and 40 in the module core 32 was performed without there having been any reversal of the positions of modules. At this stage, the bridge 10 infers that the modules 37, 38, 39 and 40 are ordered in the stack in the module core 32 in positions according to their priorities. Any other suitable scheme may be used to order the modules 37, 38, 39 and 40 according to their priorities. Once the priorities of the modules have been finalised within the module core 32, the software that manages the initialisation of the core 32 creates the queues 50-55 shown in FIG. 3, aswell as the connection paths 60-64 to the kernel 30.

The ordering of modules according to priorities allocated to those modules is advantageous in that it allows the modules to be ordered in the stack in the module core 32 in a manner dependent on user or operator commands. For instance, if a user or operator requires the cache module 39 to be provided between the iSCSI target module 37 and the reserve and release module 38 in the stack, this can be simply achieved. All that the user or operator needs to do to achieve this is to change the priority of the reserve and release module to have a value between the values of the priorities of the cache module 39 and the SCSI initiator module 40, or alternatively change the value of the priority of the cache module 39 to have a value between the values of the priorities of the iSCSI target module 37 and the reserve and release module 38. Following the change in priority, the modules will be ordered into the user- or operator-specified sequence following the next start-up, which can be instigated by the user or operator is required. Another example now follows. If a user or operator is aware that the bridge 10 is to be used primarily for data back-up, in which case the reading of data from SCSI storage devices will not be carried out very often or at all, then the user or operator may allocate a high value priority to a read cache module (not shown). In this way, the bridge 10 at start-up includes the read cache module in the stack at a position adjacent to or near to the SCSI initiator module 40, i.e. at a location in the stack which is distant to the initiator 19 and other devices which are expected to be writing data to the target 24 and to other storage devices. This can provide a performance improvement since the read cache module does not delay messages passing between initiator devices and the reserve and release module and cache modules 38, 39.

The ordering of modules according to priorities allocated to those modules is additionally advantageous in that a new module can be added at an appropriate position in the stack of modules in the module core 32 by the simple allocation of a priority to that module and by instructing the bridge 10 to include it in the stack of modules in the module core 32. The bridge 10 then is able to organise the modules in the stack in the module core 32 in an appropriate order without further user or operator input. For instance, with a bridge which had been set-up to be used solely for backing-up data to storage devices, the bridge may be converted into a storage and retrieval bridge simply by allocating a suitable priority to a read cache module, by instructing the bridge 10, for instance by remote access, to include the read cache in the stack of modules in the module core 32 and by re-setting the bridge 10. On starting-up, the bridge 10 includes the read cache module in the module core 32 at a position according to its priority and thus provides the bridge 10 with the additional read functionality.

The ordering of modules according to priorities allocated to those modules provides the bridge with configurability not previously seen in bridges. Providing the bridge 10 with configurability is advantageous for the user since it provides versatility, allowing the bridge to be used in, and operate effectively in, numerous diverse situations. Providing the bridge 10 with configurability is advantageous for the manufacturer and vendor since it allows a single product to have general applicability and thus avoids the need for plural different products to be developed, manufactured and stocked.

Instead of requiring re-start before modules are ordered according to their priorities, the bridge 10 may be arranged to that module ordering is carried out in response to a command by an operator or user. In this case, the bridge 10 may refuse to accept incoming messages and data and complete the handling of messages already received at the bridge 10 before the module ordering and the allocation of resources for newly added modules is carried out. Alternatively, the bridge 10 may be arranged to force lock status upon all or selected ones of the queues thereby, blocking the movement of information data between modules but still retaining data within the queues. If only selected ones of the queues are locked when modules are removed or added, it is the queues that are in the modules adjacent the module being removed or added and which feed or would feed that module that are locked. Clearly, it is not so important to lock queues which do not provide messages to the module being removed or added. The locking of queues provides security and data integrity advantages when inserting, removing and re-prioritising modules.

The ordering of modules according to priorities allocated to those modules also is advantageous when the bridge is operable to re-order modules dynamically, as will now be described.

In embodiments in which the bridge 10 can dynamically re-order modules, the bridge 10 monitors data flow to and/or from key modules. The bridge 10 assigns a priority to the module depending on the analysis by the bridge 10 of the flow of messages into and/or out of that module. Any suitable component of the bridge may perform the data flow analysis.

By way of example, in the case of the reserve and release module 38, the bridge 10 may monitor over a period of time the number of decisions by the reserve and release module 38 to allow commands from initiator devices to pass therethrough and the number of decisions made to block such commands, and allocate a priority to the reserve and release module 38 accordingly. For instance, if the bridge 10 determines that there is a particularly high proportion of block decisions, the bridge allocates a priority to the reserve and release module 38 which has a value lower that the value of the priority allocated to the cache module 39. In this way, when the modules are re-ordered according to their priority, the reserve and release module 38 is placed closer to the iSCSI target module 37 than the cache module 39. Thus, SCSI device messages relating to commands from initiator devices which are blocked by the reserve and release module 38 do not utilise the cache module 39. Conversely, if the bridge 10 determines that there is a particularly low proportion of block decisions, the bridge allocates a priority to the reserve and release module 38 which has a value higher that the value of the priority allocated to the cache module 39. In this way, when the modules are re-ordered according to their priority, the reserve and release module 38 is placed on the opposite side of the cache module 39 to the iSCSI target module 37. Thus, SCSI device messages relating to commands from initiator devices are not delayed by the reserve and release module 38 before being processed by the cache module 39. Clearly, each case provides a performance increase compared to the situation in which the reserve and release module 38 and the cache module 39 were in the wrong order.

Another example involves the monitoring of SCSI data messages from the cache module 39. If the bridge 10 determines that the cache module 39 when implementing a write cache is providing a particularly high proportion of 'response good' messages from commands from initiator devices, then the bridge 10 allocates a low value priority to the cache module 39.

The bridge is operable to detect when a module is impacting negatively on performance, for instance by not processing SCSI data messages as quickly as desired, and to remove temporarily that module from the stack before resuming operation without that module. For instance, the bridge 10 is operable to monitor the cache module 39 and to determine when the average delay between a message being entered into the cache module 39 and a message having the same message identifier leaving the cache module 39 (the delay being averaged over a number of messages) exceeds a predetermined threshold, and to remove the cache module 39 from the stack of modules in the module core 32 when the threshold is exceeded.

The performance of the bridge 10 after the cache module 39 has been removed is then monitored over a period of time, and that performance of the bridge 10 is compared to the performance of the bridge 10 before the cache module 39 was removed. If the performance is significantly improved by the removal of the cache module 39, then the cache module 39 is not re-inserted into the stack of modules for a pre-determined period of time. Once the cache module 39 is re-inserted, after the timeout, the performance of the bridge 10 is again measured and the performance is compared to the performance of the bridge 10 whilst the cache module 39 was not present in the module core 32. If the performance is better without the cache module 39 present, the cache module 39 is generally kept out of the stack of modules, and is re-inserted only periodically to allow comparison of the performance with and without the cache module 39 present. The inventors have found that this can provide significantly improved performance for the bridge 10 in some circumstances, particularly when the bridge is performing a large read operation from a storage target device.

The cache module 39 in effect passes-through commands and responses without any modification thereof. In particular, when it receives a SCSI data message relating to a cacheable command (such as a write command) from an initiator device, the cache module 39 processes the command and passes a suitably modified SCSI data message to the appropriate SCSI storage target device. Processing the cacheable command involves temporarily storing it in a cache element forming part of the cache module 39. The cache module 39 includes a sequential set of plural cache elements (not shown), each of which is capable of storing one cacheable command. On subsequently receiving a response from the SCSI storage target device, as part of a SCSI data message, the cache module 39 passes a suitable SCSI data message back to the initiator device. In accordance with the SCSI standard, the response can take one of a number of forms. In particular, the response may be a 'response good' message, indicating that the write command and corresponding data has been accepted by the SCSI target device. The response may alternatively be an 'error' response, indicating that the write command was not accepted by the SCSI target device. There are a number of other responses which can validly be made.

For instance, if a write command was accepted by a SCSI target device, which therefore issues a 'response good' response, and is subsequently found by the SCSI target device not to be executable for some reason, the SCSI target device issues a 'deferred error' response. On receiving such a response, the cache module 39 passes the 'deferred error' response back to the appropriate initiator device. According to the SCSI standard, an initiator device on receiving such a 'deferred error' response is entitled to send a message requesting from the SCSI target device information concerning the nature of the error. The cache module 39 is operable to pass through such a message to the SCSI target device, and also to pass through the response of the SCSI target device to the initiator's request. The response may include information concerning the error, or it may indicate that the ability to provide information concerning the error is not supported by the SCSI target device.

In the above, pointers to the raw data are passed through the module core 32, and the data itself remains in the memory 13. Alternatively, the raw data can be passed through the module core 32 and the modules 37-40 along with the SCSI data messages.

Although the invention has been described applied to a bridge 10 having two network connections, the invention is not limited to this. Instead, the invention is applicable to any bridge which has two or more network connections. For instance, providing a bridge incorporating three different network connections can allow initiator devices of different types to access storage devices of a particular type connected on a SAN by connecting the initiator devices to different network connectors on the bridge. For instance, iSCSI and Fibre Channel initiators both can access SCSI storage devices by providing a device comprising a SCSI network connection and Fibre Channel and IP network connections. Alternatively, there may be plural SANs, operating according to the same or according to different protocols. The SANs may be accessible by one, two or more different types of initiator device.

What is claimed is:

1. A bridge comprising:
   first and second network connections,
   a processor, and
   memory,
   said processor and said memory together being configured to implement plural software modules, said software modules being configured for allowing data messages to be passed between said first and second network connections, for handling said data messages as they pass between said first and second network connections and for performing processing on said data messages according to the function provided by said software modules, wherein said processing by at least one of said software modules comprises said at least one of said software modules modifying said data messages; wherein each of said software modules has associated therewith a respective priority, and wherein said bridge is configured to arrange said software modules in a sequence between said first and second network connections, such that a data message provided by a software module is received at a next software module in said sequence, according to their allocated priorities wherein said bridge is configured to monitor flow of data messages to or from a first module, to reassign a priority to said first module based on said flow of data messages, and to re-order said software modules based on said priority re-assigned to said first module.

2. A bridge as claimed in claim 1, wherein said priorities are associated with said software modules during start-up of said bridge.

3. A bridge as claimed in claim 2, wherein said priorities allocated to said software modules are pre-set in software.

4. A bridge as claimed in claim 1, wherein said priorities are settable or modifiable by said bridge in response to said bridge receiving a priority setting or modifying command from a device connected to said bridge.

5. A bridge as claimed in claim 1, wherein said bridge is responsive to receiving an instruction to add a new software module to insert that software module into said sequence of software modules at a position appropriate to a priority associated with said new software module.

6. A bridge as claimed in claim 1, wherein said bridge is configured dynamically to re-assign a priority to one of said software modules and to re-order said software modules according to their priorities after said re-assignment.

7. A bridge as claimed in claim 1, wherein said first software module is a reserve and release module, and wherein said bridge is configured to determine a measure of a frequency of decisions by said reserve and release module to allow commands from initiator bridges to pass-through and a measure of decisions made to block commands, and to allocate a priority to said reserve and release module based on said determination.

8. A bridge comprising:
first and second network connections,
a processor, and
memory,
the processor and said memory together being configured to implement plural software modules, said software modules being configured for allowing data to be passed between said first and second network connections and for handling said data as it passes between said first and second network connections,
wherein each of said software modules has associated therewith a respective priority, and wherein said bridge is configured to arrange said software modules in a sequence between said first and second network connections, such that data provided by a software module is received at a next software module in said sequence, according to their allocated priorities, wherein said bridge is configured:
to perform a first monitoring of performance of said bridge;
to remove temporarily a first software module that is determined in said first monitoring of said performance of said bridge to be impacting negatively on performance;
subsequent to removal of said first software module and in the absence of said first software module, to perform a second monitoring of said performance of said bridge; and
to re-insert said first software module at a time dependent on results of said second monitoring of said performance of said bridge.

9. A bridge as claimed in claim 8, wherein said priorities are associated with said software modules during start-up of said bridge.

10. A bridge as claimed in claim 9, wherein said priorities allocated to said software modules are pre-set in software.

11. A bridge as claimed in claim 8, wherein said priorities are settable or modifiable by said bridge in response to said bridge receiving a priority setting or modifying command from a device connected to said bridge.

12. A bridge as claimed in claim 8, wherein said bridge is responsive to receiving an instruction to add a new software module to insert that software module into said sequence of software modules at a position appropriate to a priority associated with said new software module.

13. A bridge as claimed in claim 8, wherein said bridge is configured dynamically to re-assign a priority to a software module and to re-order said software modules according to their priorities after said re-assignment.

14. A bridge as claimed in claim 8, wherein said bridge is configured to monitor data flow to or from a module, and to assign a priority to that module on said basis of said data flow,
wherein one of said software modules is a reserve and release module, and
wherein said bridge is configured to determine a measure of a frequency of decisions by said reserve and release module to allow commands from initiator bridges to pass-through and a measure of decisions made to block commands, and to allocate a priority to said reserve and release module based on said determination.

15. A bridge comprising:
first and second network connections,
a processor, and
memory,
the processor and said memory together being configured to implement plural software modules, said software modules being configured for allowing data to be passed between said first and second network connections and for handling said data as it passes between said first and second network connections,
wherein each of said software modules has associated therewith a respective priority, and wherein said bridge is configured to arrange said software modules in a sequence between said first and second network connections, such that data provided by a software module is received at a next software module in said sequence, according to their allocated priorities, said bridge further comprising plural queues, each of said plural queues being configured to store temporarily messages being passed between two adjacent software modules, each of said plural queues being able to be written to by one of said two adjacent software modules,
the bridge being configured to prevent a first software module from being able to read a data a first queue of the first software module whilst that data message or another data message is being written to said first queue by a second software module, the second software module being adjacent to the first software module, by being configured:
when the second software module is read to pass a first data message to the first module, to lock the first queue such as to prevent reading from the first queue by the first software module,
subsequent to locking the first queue, to write the first data message to the first queue,
on completion of writing the first data message to the first queue by the second module, to release the lock of the first queue, and
to signal to the first module that the lock of the first queue is released.

16. A bridge as claimed in claim 15, wherein said priorities are associated with said software modules during start-up of said bridge.

17. A bridge as claimed in claim 16, wherein said priorities allocated to said software modules are pre-set in software.

18. A bridge as claimed in claim 15, wherein said priorities are settable or modifiable by said bridge in response to said bridge receiving a priority setting or modifying command from a device connected to said bridge.

19. A bridge as claimed in claim 15, wherein said bridge is responsive to receiving an instruction to add a new software module to insert that software module into said sequence of software modules at a position appropriate to a priority associated with said new software module.

20. A bridge as claimed in claim 15, wherein said bridge is configured dynamically to re-assign a priority to a software module and to re-order said software modules according to their priorities after said re-assignment.

21. A bridge as claimed in claim 15, wherein said bridge is configured to monitor data flow to or from a module, and to assign a priority to that module on said basis of said data flows wherein one of said software modules is a reserve and release module, and wherein said bridge is configured to determine a measure of a frequency of decisions by said and release module to allow commands from initiator bridges to pass-through and a measure of decisions made to block commands, and to allocate a priority to said reserve and release module based on said determination.

22. A bridge as claimed in claim 15, wherein said bridge is configured to enter said queues in all of said software modules forming part of said sequence of modules into said locked state and, whilst said queues are locked, to insert one or more software modules into said sequence of modules.

23. A bridge as claimed in claim 15, wherein said bridge is configured to enter all of said queues in all of said software modules forming part of said sequence of modules into said locked state and, whilst said queues are locked, to remove one or more software modules from said sequence of modules.

24. A bridge as claimed in claim 15, wherein said bridge is configured to enter said queues in two adjacent software modules forming part of said sequence of modules into said locked state and, whilst said queues are locked, to insert one or more software modules in said sequence of modules between said two adjacent software modules.

25. A bridge as claimed in claim 15, wherein said bridge is configured to enter said queues in software modules immediately adjacent a subsequence of one or more software modules forming part of said sequence of modules into said locked state and, whilst said queues are locked, to remove said subsequence of modules from said sequence of modules.

* * * * *

UNITED STATES PATENT AND TRADEMARK OFFICE
CERTIFICATE OF CORRECTION

PATENT NO. : 7,653,774 B2
APPLICATION NO. : 11/637190
DATED : January 26, 2010
INVENTOR(S) : Paul Burgess et al.

Page 1 of 1

It is certified that error appears in the above-identified patent and that said Letters Patent is hereby corrected as shown below:

In Column 14, Claim 15, Line 30:
    Please delete "a data a" and insert --a data message from a--.

In Column 14, Claim 15, Line 36:
    Please delete "read" and insert --ready--.

In Column 14, Claim 21, Line 67:
    Please delete "flows" and insert --flow--.

In Column 15, Claim 21, Line 71:
    Please delete "said and" and insert --said reserve and--.

Signed and Sealed this

Twentieth Day of July, 2010

David J. Kappos
*Director of the United States Patent and Trademark Office*